United States Patent
Wyatt et al.

(10) Patent No.: US 8,570,331 B1
(45) Date of Patent: Oct. 29, 2013

(54) SYSTEM, METHOD, AND COMPUTER PROGRAM PRODUCT FOR POLICY-BASED ROUTING OF OBJECTS IN A MULTI-GRAPHICS PROCESSOR ENVIRONMENT

(75) Inventors: David Wyatt, San Jose, CA (US); Lieven P. Leroy, South San Francisco, CA (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1199 days.

(21) Appl. No.: 11/843,506

(22) Filed: Aug. 22, 2007

Related U.S. Application Data

(60) Provisional application No. 60/823,429, filed on Aug. 24, 2006.

(51) Int. Cl.
*G06F 15/16* (2006.01)
*G06F 15/00* (2006.01)
*G06F 15/80* (2006.01)
*G06F 1/00* (2006.01)
*G06F 1/32* (2006.01)

(52) U.S. Cl.
USPC ........... 345/502; 345/501; 345/503; 345/504; 345/505; 345/506; 713/320; 713/324

(58) Field of Classification Search
None
See application file for complete search history.

(56) References Cited

U.S. PATENT DOCUMENTS

| | | | |
|---|---|---|---|
| 6,670,958 B1 * | 12/2003 | Aleksic et al. ................ | 345/502 |
| 6,891,543 B2 | 5/2005 | Wyatt ............................ | 345/541 |
| 7,015,915 B1 | 3/2006 | Diard ............................ | 345/522 |
| 7,050,071 B2 | 5/2006 | Wyatt et al. ................... | 345/649 |
| 7,053,901 B2 | 5/2006 | Huang et al. .................. | 345/503 |
| 7,075,541 B2 | 7/2006 | Diard ............................ | 345/505 |
| 7,170,757 B2 | 1/2007 | Driscoll et al. ............... | 361/785 |
| 7,620,613 B1 * | 11/2009 | Moore et al. .................... | 706/62 |
| 2002/0118201 A1 * | 8/2002 | Mukherjee et al. ........... | 345/504 |
| 2007/0283175 A1 * | 12/2007 | Marinkovic et al. .......... | 713/320 |
| 2008/0034238 A1 * | 2/2008 | Hendry et al. ................ | 713/323 |

OTHER PUBLICATIONS

U.S. Appl. No. 10/877,243, filed Jun. 25, 2004.
U.S. Appl. No. 11/093,890, filed Mar. 29, 2005.
U.S. Appl. No. 11/247,754, filed Jun. 29, 2006.
U.S. Appl. No. 10/652,608, filed Aug. 28, 2003.
U.S. Appl. No. 11/069,163, filed Feb. 28, 2005.
U.S. Appl. No. 11/016,011, filed Dec. 17, 2004.
U.S. Appl. No. 11/015,600, filed Dec. 16, 2004.
U.S. Appl. No. 60/823,429, filed Aug. 24, 2006.
U.S. Appl. No. 10/789,248, filed Feb. 27, 2004.
U.S. Appl. No. 11/358,611, filed Feb. 21, 2006.
U.S. Appl. No. 11/267,611, filed Nov. 4, 2005.
U.S. Appl. No. 11/260,940, filed Oct. 28, 2005.
U.S. Appl. No. 11/016,586, filed Dec. 17, 2004.
U.S. Appl. No. 10/950,609, filed Sep. 27, 2004.
U.S. Appl. No. 11/604,105, filed Nov. 22, 2006.
U.S. Appl. No. 10/822,015, filed Apr. 9, 2004.
U.S. Appl. No. 10/822,013, filed Apr. 9, 2004.

* cited by examiner

*Primary Examiner* — Tize Ma
(74) *Attorney, Agent, or Firm* — Zilka-Kotab, PC

(57) ABSTRACT

A software layer is disposed between an application and a driver. In use, the software layer is adapted to receive an object from the application intended to be rendered by a first graphics processor. Such software layer, in turn, routes the object to a second graphics processor, based on a policy.

30 Claims, 8 Drawing Sheets

SYSTEM, METHOD, AND COMPUTER PROGRAM PRODUCT FOR POLICY-BASED ROUTING OF OBJECTS IN A MULTI-GRAPHICS PROCESSOR ENVIRONMENT

RELATED APPLICATION(S)

The present application claims priority from a provisional application filed Aug. 24, 2006 under Ser. No. 60/823,429, which is incorporated herein by reference in its entirety.

FIELD OF THE INVENTION

The present invention relates to multi-graphics processor environments, and more particularly to routing objects to be rendered in such environments.

BACKGROUND

In some graphics environments, more than one graphics processor is available for graphics processing purposes. For example, a first graphics processor may be capable of providing a limited amount of graphics processing capabilities as well as using system memory, as opposed to its own dedicated memory. Still yet, a second graphics processor may be provided with more advanced graphics processing capabilities as well as its own dedicated memory. Of course, such additional processing capabilities generally come at increased cost in terms of power, etc. There may also be secondary sources for an increase; for example, greater memory usage, data bus activity (e.g. PCI Express), or transistor leakage (which increases with increased overall silicon area), etc.

There is a continuing need for addressing the various trade-offs (e.g. performance vs. power, etc.) associated with such multi-graphics processor systems.

SUMMARY

A software layer is disposed between an application and a driver. In use, the software layer is adapted to receive an object from the application intended to be rendered by a first graphics processor. Such software layer, in turn, routes the object to a second graphics processor, based on a policy.

DETAILED DESCRIPTION

Figure 1A:
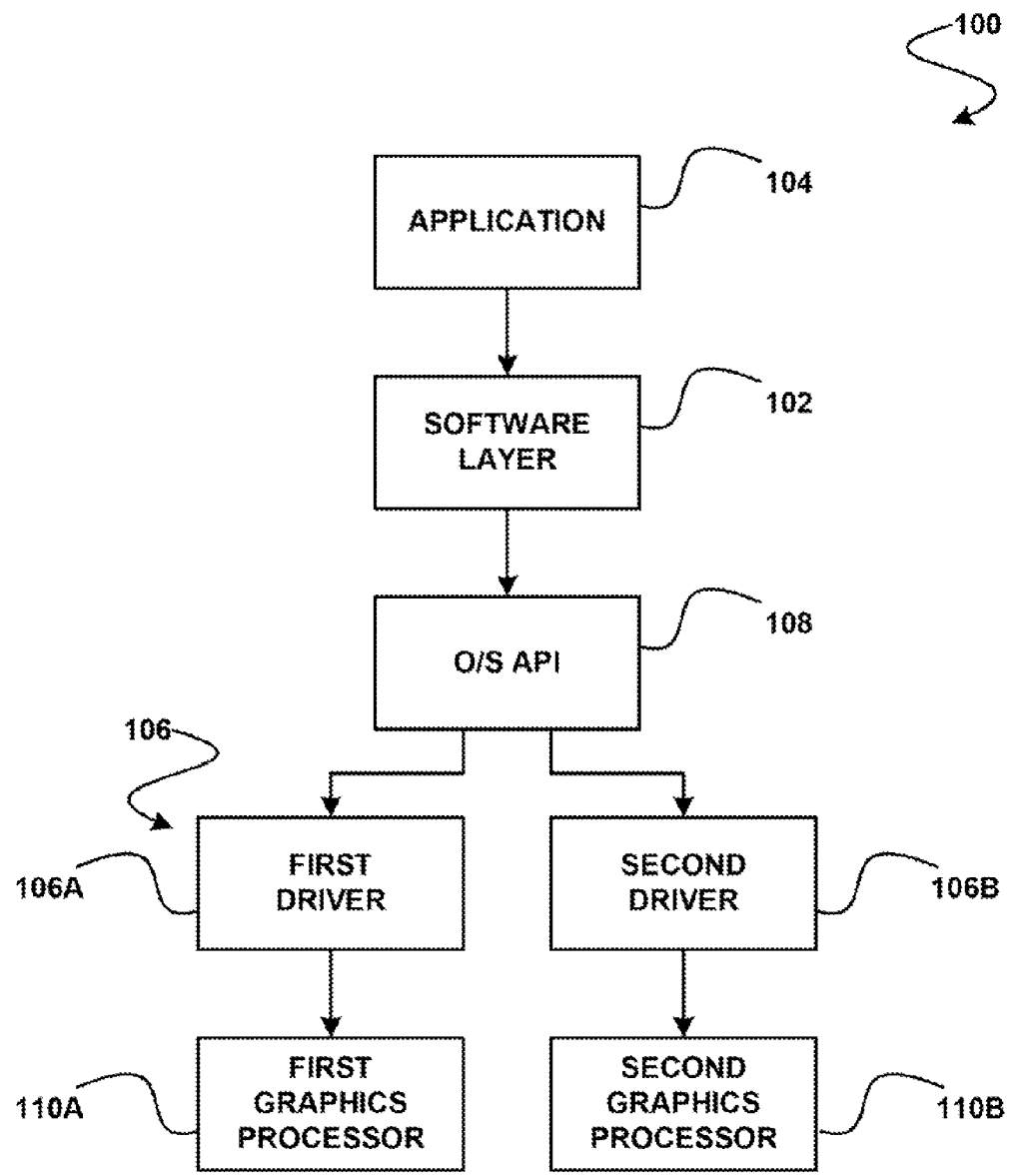
FIG. 1A shows a system for policy-based routing of objects to be rendered in a multi-graphics processor environment, in accordance with one embodiment.

FIG. 1A shows a system 100 for policy-based routing of objects to be rendered in a multi-graphics processor environment, in accordance with one embodiment. As shown, the system 100 includes a software layer 102 disposed between an application 104 and a plurality of drivers 106. In the context of the present description, the application 104 may include any computer code that is capable of delivering objects to be rendered by at least one graphics processor. Further, while one application 104 is illustrated, it should be noted any number of different applications 104 may be present and simultaneously delivering objects to be rendered by at least one graphics processor.

Further, each of the drivers 106 may include any computer code that is capable of interfacing at least one associated graphics processor with an operating system, other computer code, or any other entity, for that matter. In the illustrated embodiment, the drivers 106 are shown to comprise two drivers including a first driver 106A adapted for interfacing a first graphics processor 110A, and a second driver 106B adapted for interfacing a second graphics processor 110B. In the present description, the term graphics processor refers to any hardware that is equipped with graphics processing capabilities (e.g. in the form of a chipset, system-on-chip (SOC), core integrated with a CPU, discrete processor, etc.). Of course, additional drivers 106 may further be provided each with an associated graphics processor. In one embodiment, the drivers 106 may be loaded and exposed during use via a graphics application program interface (API) (e.g. DirectX, OpenGL, etc.).

It should be noted that the foregoing components may be configured, arranged, etc. in any desired manner. In the present embodiment, the system 100 is shown to include an operating system API 108 disposed between the software layer 102 and the drivers 106. Of course, other configurations are contemplated.

Figure 1B:
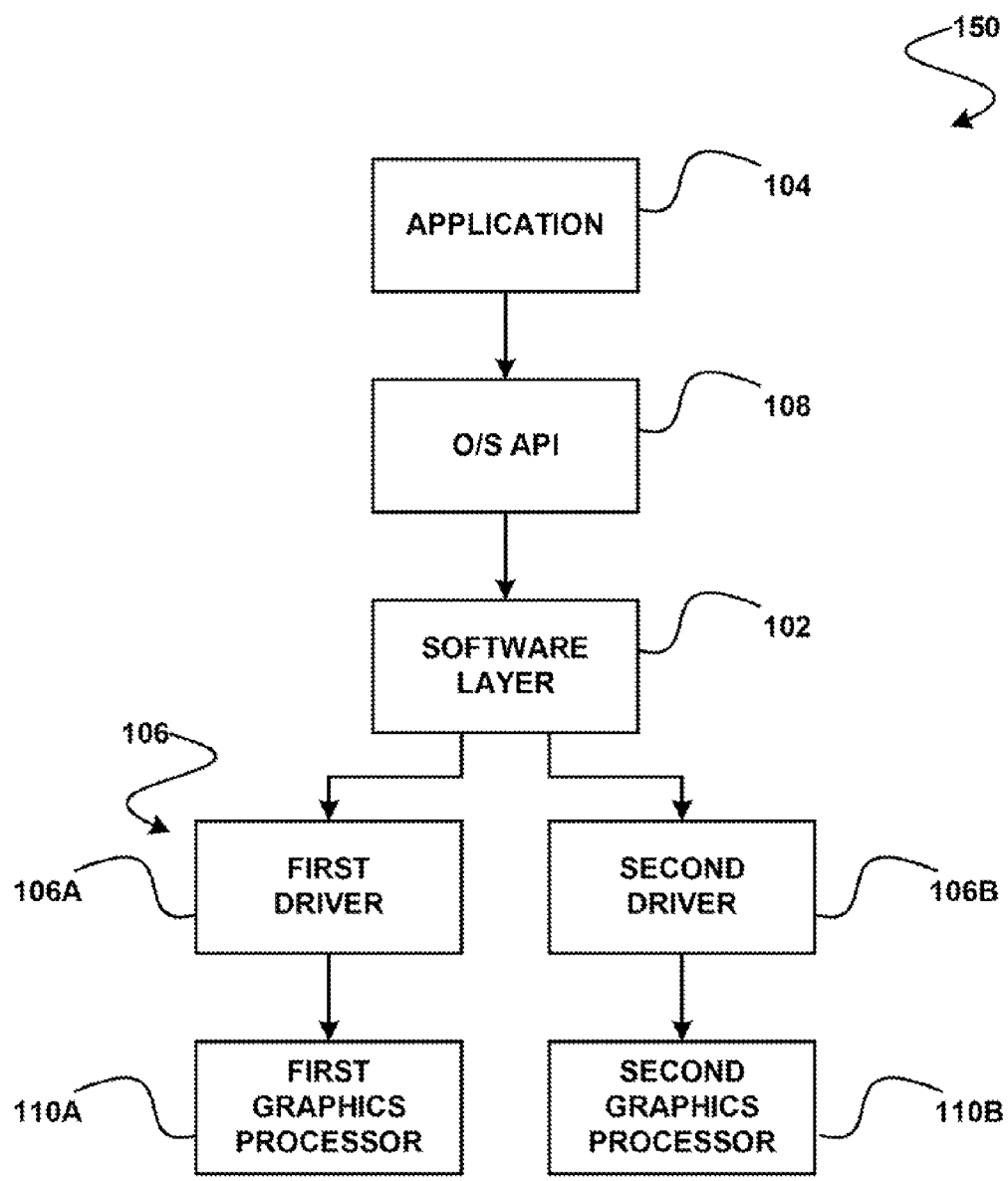
FIG. 1B shows a system for policy-based routing of objects to be rendered in a multi-graphics processor environment where the operating system application program interface (API) is disposed between the application and the software layer, in accordance with another embodiment.

For example, FIG. 1B shows a system 150 for policy-based routing of objects to be rendered in a multi-graphics processor environment where the operating system API 108 is disposed between the application 104 and the software layer 102, in accordance with another embodiment. In the present embodiment, the software layer 102 may be exposed as the only available graphics driver via a graphics API. Further, the drivers 106 may be loaded as driver modules of such single driver. Of course, the exemplary configurations of FIGS. 1A and 1B are illustrative in nature, as any component may or may not be disposed between the software layer 102, application 104, drivers 106, etc.

With continuing reference to FIG. 1A, the first graphics processor 110A and the second graphics processor 110B may take any form. In one embodiment, the first graphics processor 206 may include an integrated graphics processor (IGP) which may or may not be a component of a chipset resident on a motherboard. Such IGP may be capable of providing a limited amount of graphics processing capabilities as well as using system memory, as opposed to its own dedicated memory. Further, the second graphics processor 110B may include a GPU with each of its various modules (e.g. shader modules, a rasterization module, etc.) integrated on a single semiconductor platform. The GPU may be provided with more advanced graphics processing capabilities as well as its own dedicated memory. Of course, in various embodiments, the first and second graphics processor 110A, 110B may or may not be symmetric and, if asymmetric, such asymmetry may arise from any desired difference in capabilities or performance between the graphics processors 110A, 110B.

In the context of the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

In various other embodiments, the graphics processor may be internally or externally located with respect to a primary computing processor board, chipset, etc. Implementations are also contemplated where a graphics processor is physically removable (e.g. utilizing a docking station with built-in graphics capabilities, etc.). Of course, in the context of the present description, the term graphics processor refers to any hardware processor capable of processing graphics data.

Also in the context of the present description, the software layer 102 may include any layer of software disposed, at least in part, between an application 104 and a plurality of drivers 106. Just by way of example, the software layer 102 may optionally include an additional driver, a wrapper, API, etc. Still yet, in another embodiment, the software layer 102 may be distributed in nature. For example, it may include multiple wrappers that interface with various components (e.g. the application 104, drivers 106, etc.). Further, the software layer 102 may, in other embodiments, make the drivers 106 appear as a single driver for accommodating operating system requirements, etc.

During use in accordance with one embodiment, the software layer 102 is adapted to receive an object from the application 104 which is intended to be rendered by the first graphics processor 110A. Such object may include any primitive, line, and/or any other entity capable of being rendered. Further, in one embodiment, the application 104 itself may designate the object to be rendered by the first graphics processor 110A. Of course, various embodiments are contemplated where other entities make such designation. Thereafter, the software layer 102, in turn, routes the object to a second graphics processor 110B, based on a policy.

In the context of the present description, the policy may include any rule, guideline, principal, etc. that governs the manner in which the object is routed. In the context of various exemplary optional embodiments, the policy may relate to various aspects of the system 100.

Just by way of example, the policy may be power related, in one embodiment. In such embodiment, the policy may be a function of an existence of an alternating current (AC) source. For example, if the AC source is available, the object may be routed to a higher performance graphics processor which consumes more power such as a GPU, etc. On the other hand, if the AC source is unavailable, the object may be routed to a lower performance graphics processor which consumes less power such as an IGP, etc. To this end, battery power may be preserved.

In another embodiment, the policy may be object related. For example, the policy may be a function of a format of the object to be rendered. In one example of use, the policy may route objects that require extensive processing to a higher performance graphics processor such as a GPU, etc. that is capable of accommodating the same. Such processing-intensive formats may include full screen three-dimensional (3-D) formats, etc. On the hand, the policy may route objects that require less processing [e.g. two dimensional (2-D), graphics device interface (GDI), user interface (UI), etc.] to a lower performance graphics processor such as an IGP, etc.

In still another embodiment, the policy is a user configured. In one particular embodiment, user provided input may indicate a preference for performance versus battery efficiency. For example, the user may choose a balance between power savings and performance, such that the object is routed accordingly. In other embodiments, such user configuration may optionally be carried out utilizing a mechanical switch or a UI. For example, user provided input via a button, a system setup option, or a runtime UI may affect a selection of the policy.

The policy may also support system power schemes dictated by the operating system, etc. Still yet, routing of multiple objects may be adaptive in nature and may thus change as a function of the operating environment, external parameters, or any other input, for that matter. Further, user provided input may affect a preference between different graphics processors.

In still yet another embodiment, the policy may be application related. In such embodiment, the policy may be a function of a type of the application. Examples of applications (e.g. see application 104, etc.) include a game application, a standard definition digital versatile disc (SD/DVD) application, a high definition DVD (HD/DVD) application, a Blu-ray application, etc. In the context of one example of use, the policy may route objects from each of the above applications to a higher performance graphics processor except objects from a SD/DVD application, which may be routed to a lower performance, but higher power-efficiency, graphics processor.

In another aspect of the current embodiment, the policy may be a function of a processor load that is incurred by the application. Such application load may be monitored by a sensor or the like. To this end, the policy may route objects from higher-load applications to a higher performance graphics processor, and further route objects from lower-load applications to a lower performance graphics processor. In related embodiments, the routing may further be refined by various relevant aspects of the system 100 including, but not limited to central processing unit (CPU) frequency, a GPU clock, an integrated graphics processor (IGP) or a graphics and memory controller hub (GMCH) clock, an operating system on which an application is executed, etc.

Moving on to yet another embodiment, the policy may be display related. Specifically, the policy may be a function of a type of the display on which the rendered object is to be depicted. Examples of displays include an HD multimedia interface (HDMI) display, an HD television (HDTV) display, an SDTV display, etc. In the context of one example of use, the policy may route objects to be displayed on each of the above display types to a higher performance graphics processor with the exception of objects to be displayed on the SDTV display, which may be routed to a lower performance graphics processor.

It should be noted that the foregoing policies may or may not be combined in any desired manner. To this end, the policy may be multi-faceted for routing objects as a function of multiple aspects of the system 100. Further, the policy may be implemented in any desired way that results in proper routing of the object(s). Just by way of example, a table may be used that correlates various aspects of the system 100 with the appropriate graphics processor. Of course, other techniques (e.g. using algorithms, etc.) are contemplated as well.

Still yet, in other embodiments, the rendering of various related objects may even be shared among multiple graphics processors. For example, in the context of the aforementioned display type-related policy, objects to be rendered by a low voltage differential signaling (LVDS) display may be routed to multiple graphics processors, so that any rendering may be shared. Additional optional modifications, optimizations, etc. may be readily incorporated, as desired. For example, application threads may be bound to a particular graphics processor until terminated, to avoid the penalty of migrating the content and state from one processor to another, etc.

As yet another option, the software layer 102 may perform a power saving option in a situation where no objects are being routed to one of the graphics processors 110A, 110B. In one embodiment, such power savings operation may involve disabling, powering down, placing in a sleep mode, etc. one of the graphics processors 110A, 110B that is currently not in use. Of course, the associated drivers 106 may or may not be unloaded, disabled, etc. in a similar manner.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
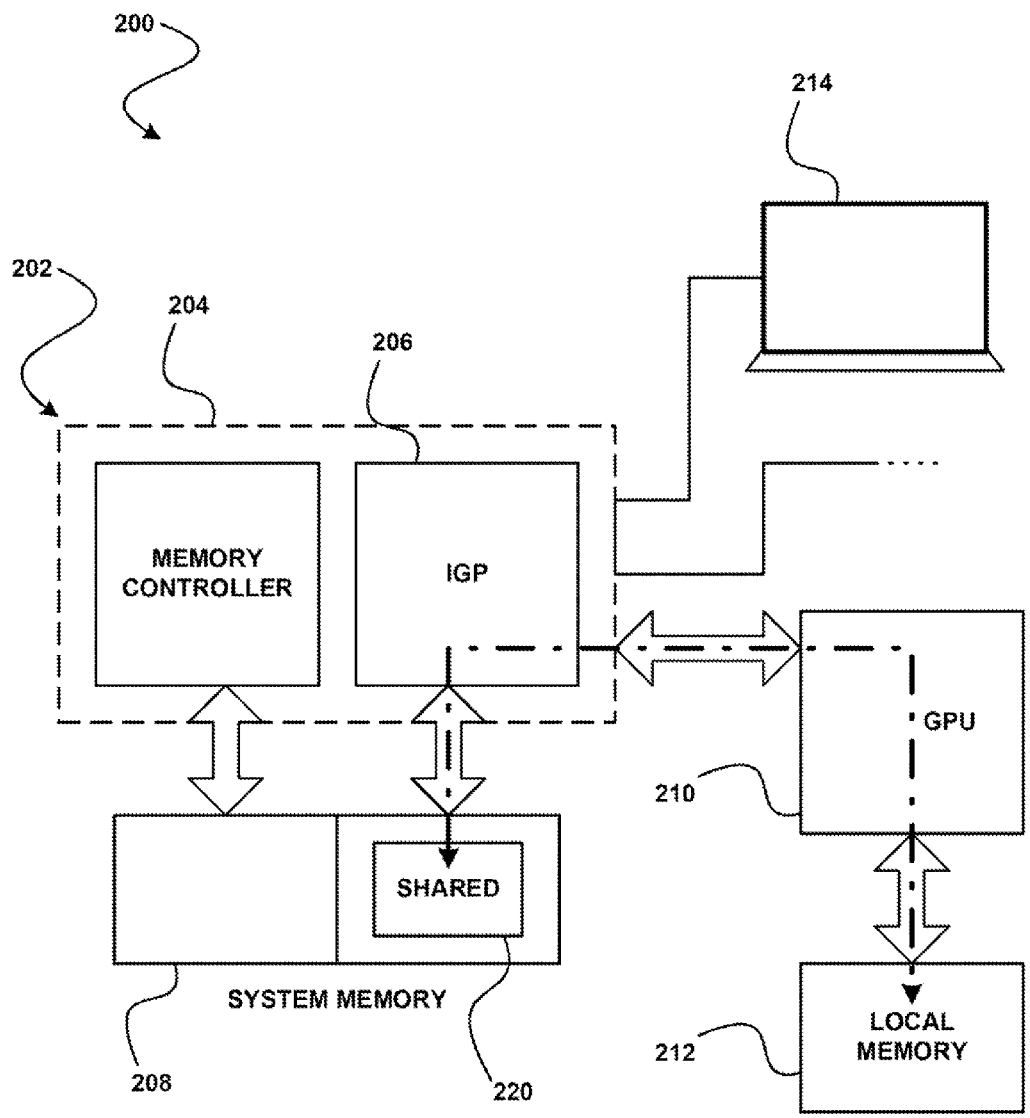
FIG. 2A shows a system for policy-based routing of objects to be rendered in a multi-graphics processor environment, in accordance with another embodiment.

FIG. 2A shows a system 200 for policy-based routing of objects to be rendered in a multi-graphics processor environment, in accordance with another embodiment. As an option, the present system 200 may be implemented in accordance with the framework set forth during the description of FIG. 1A or 1B. Of course, however, the system 200 may be used in any desired environment. Still yet, the above definitions apply during the following description.

As shown, the system 200 includes a plurality of host components 202 comprising a memory controller 204 and an IGP 206 which interface a CPU (not shown) and work together to access system memory 208 via a communication bus or the like. Control logic (software) and data may be stored in such system memory 208, which may take the form of random access memory (RAM), etc.

The system 200 is also equipped with a GPU 210 with associated local memory 212. Of course, while two graphics processors are shown, a system with more than two of such graphics processors is also contemplated. Further, such graphics processors may take forms other than an IGP, GPU, etc.

While not shown, the GPU 210 may further interface a PCI Express bus. Such PCI Express bus may include an I/O interconnect bus standard (which includes a protocol and a layered architecture) that expands on and increases the data transfer rates of the system 200. Specifically, the PCI Express bus may include a two-way, serial connection that carries data in packets along two pairs of point-to-point data paths, compared to single parallel data bus of traditional techniques. In yet another embodiment, NVIDIA® SLI™ technology may be used to connect additional graphics processors and associated cards for improved performance.

Further included are one or more displays 214. Such displays 214 may take the form of a television, a CRT, a flat panel display, and/or any of the previously mentioned types (e.g. HDMI display, HDTV display, SDTV display, LVDS display), etc.

While not shown, the computer system 200 may also include a secondary storage. The secondary storage includes, for example, a hard disk drive and/or a removable storage drive, representing a floppy disk drive, a magnetic tape drive, a compact disk drive, etc. In use, such removable storage drive reads from and/or writes to a removable storage unit in a well known manner.

Thus, computer programs, or computer control logic algorithms, may be stored in the system memory 208 and/or the unillustrated secondary storage. Such computer programs, when executed, enable the computer system 200 to perform various functions. In the context of the present description, the system memory 208, storage and/or any other storage are possible examples of computer-readable media.

Still yet, from a system perspective, such architecture and/or functionality may also be implemented in the context of a general computer system, a circuit board system, a game console system dedicated for entertainment purposes, an application-specific system, and/or any other desired system, for that matter.

In use, the IGP 206 and the GPU 210 share a frame buffer 220 of the IGP 206 during the course of rendering objects routed to them. As further shown in the current embodiment, an output of the IGP 206 is exclusively used to feed the display 214. To accomplish this, the GPU 210 copies rendered objects into the single frame buffer 220 so that they may be outputted under the control of the IGP 206. More information regarding such memory sharing will be set forth during the description of FIGS. 3-5.

Figure 2B:
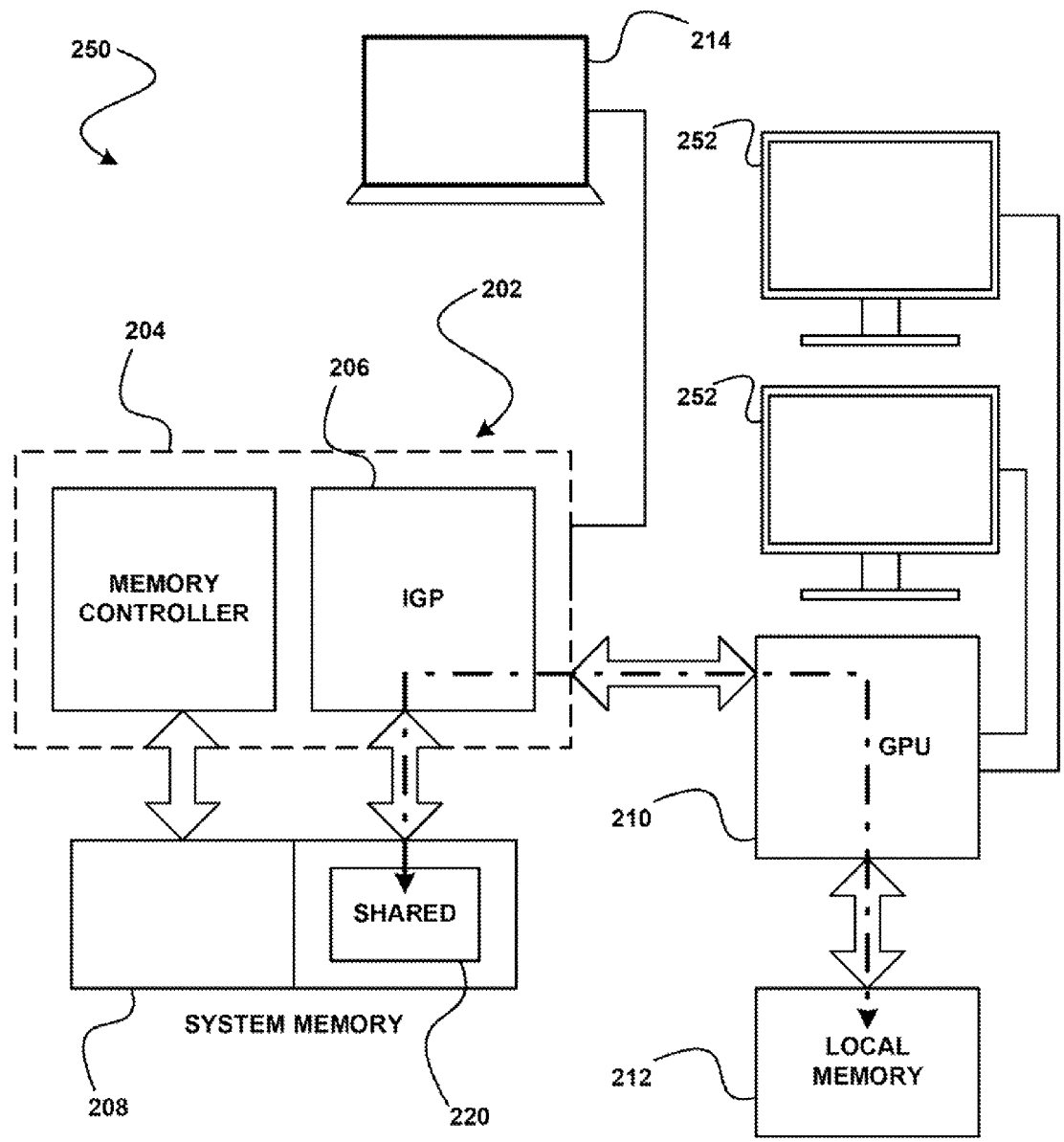
FIG. 2B shows a system for policy-based routing of objects to be rendered in a multi-graphics processor environment, in accordance with still another embodiment.

FIG. 2B shows a system 250 for policy-based routing of objects to be rendered in a multi-graphics processor environment, in accordance with still another embodiment. Similar to the embodiment of FIG. 2A, the present system 250 may be implemented in accordance with the framework set forth during the description of FIG. 1A or 1B. Of course, however, the system 250 may be used in any desired environment. Again, the above definitions apply during the following description.

Unlike the system 200 of FIG. 2A, the system 250 includes one or more displays 252 coupled to an output of the GPU 210. To this end, both the IGP 206 and the GPU 210 may be used to drive the display 214, while the GPU 210 may be used to exclusively drive the one or more displays 252. In one possible embodiment, a chipset or operating system may be used to dynamically route legacy resources to the appropriate graphics processor.

Figure 3:
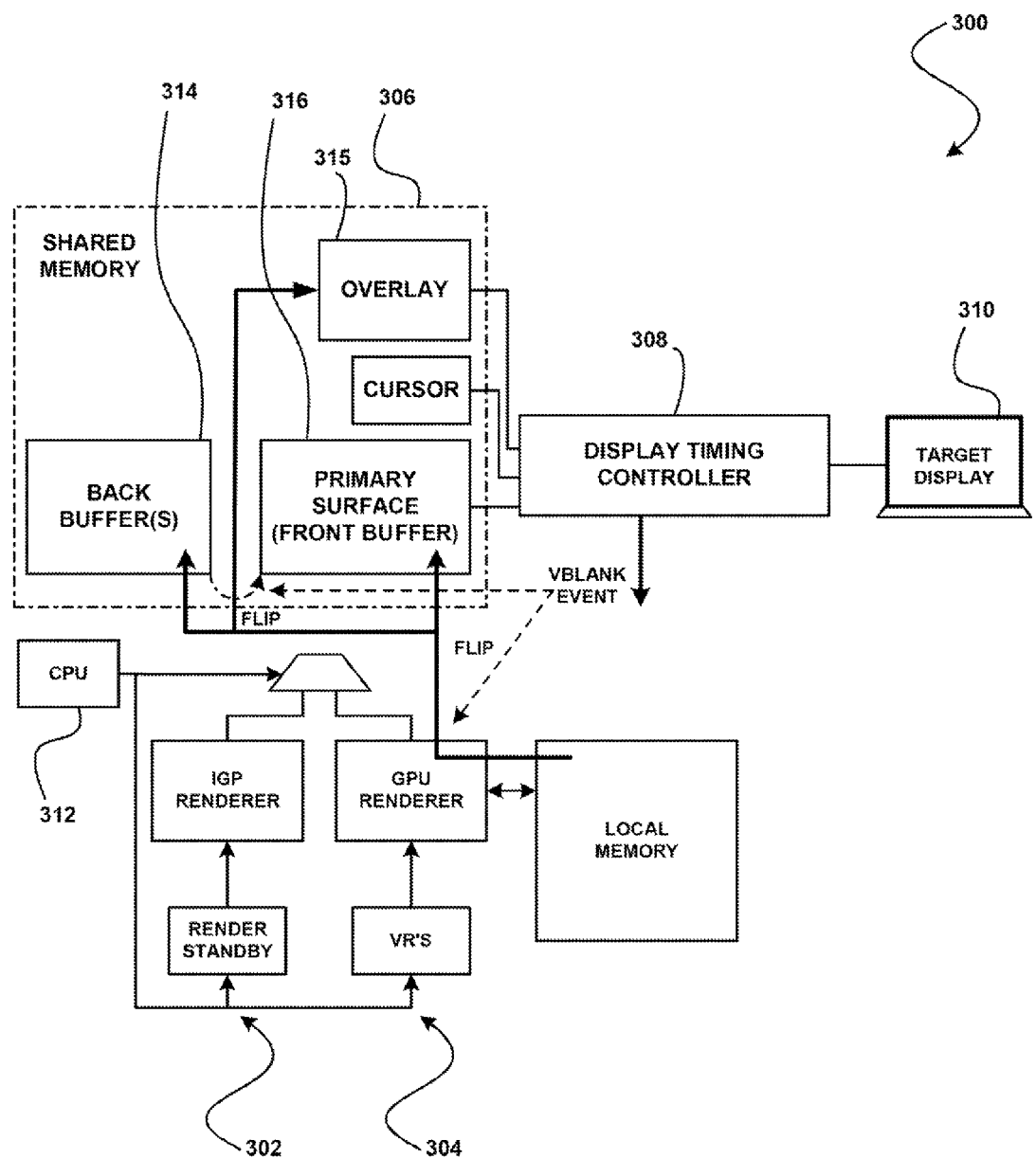
FIG. 3 shows a framework for sharing memory in a multi-graphics processor environment, in accordance with one embodiment.

FIG. 3 shows a framework 300 for sharing memory in a multi-graphics processor environment, in accordance with one embodiment. While the framework 300 may be implemented in accordance with any of the features set forth during the description of FIG. 1A-2B, the framework 300 may be used in any desired environment. Yet again, the above definitions apply during the following description.

As shown, both an IGP 302 and a GPU 304 are shown to share memory 306, similar to that shown in FIGS. 2A and 2B. Such shared memory 306, in turn, feeds an IGP display timing controller 308 and associated display 310. In use, a software layer (e.g. see software layer 102 of FIG. 1A/1B, etc.) works in conjunction with a CPU 312 for routing objects to be rendered by the IGP 302 and GPU 304. Upon rendering by either the IGP 302 or the GPU 304, such rendered objects are fed into back buffers 314 which, in turn feed, a front buffer 316 which makes the rendered objects available via the IGP display back-end which drives the display output.

In use, the switch (e.g. "flip," etc.) between the back buffers 314 and the front buffer 316 may be triggered in response to a vertical blanking signal. It should be noted that an overlay source/buffer 315 may also be the subject of such switch. This may, for example, be the case when using the GPU 304 to accelerate HD video.

Since, in the embodiment shown, the output of the IGP 302 is exclusively used to feed the display 310, the aforementioned vertical blanking signal is also fed directly to the GPU 304. As an option, such vertical blanking signal, along with any other desired feedback information, may be fed to the GPU 304 via the aforementioned software layer. To this end, the GPU 304 can copy rendered objects into the back buffers 314 of the shared memory 306 in a manner that is synchronized with the display of such objects that is being managed by the IGP 302.

In one embodiment, the software layer may be used in the foregoing manner by intercepting the vertical blanking signal which would typically trigger an interrupt service routine (ISR) that merely flips the back buffers 314/front buffer 316. By intercepting such ISR, in such a manner, an additional ISR may instead be initiated which not only performs the foregoing functionality, but also feeds the signal to the GPU 304 so that it may be synchronized accordingly. Of course, depending on the particulars of the operating system, the foregoing software layer interception may be interposed with respect to any desired entity [e.g. device driver interface (DDI), graphics device interface (GDI), kernel mode driver (KMD), miniport, etc.].

Figure 4:
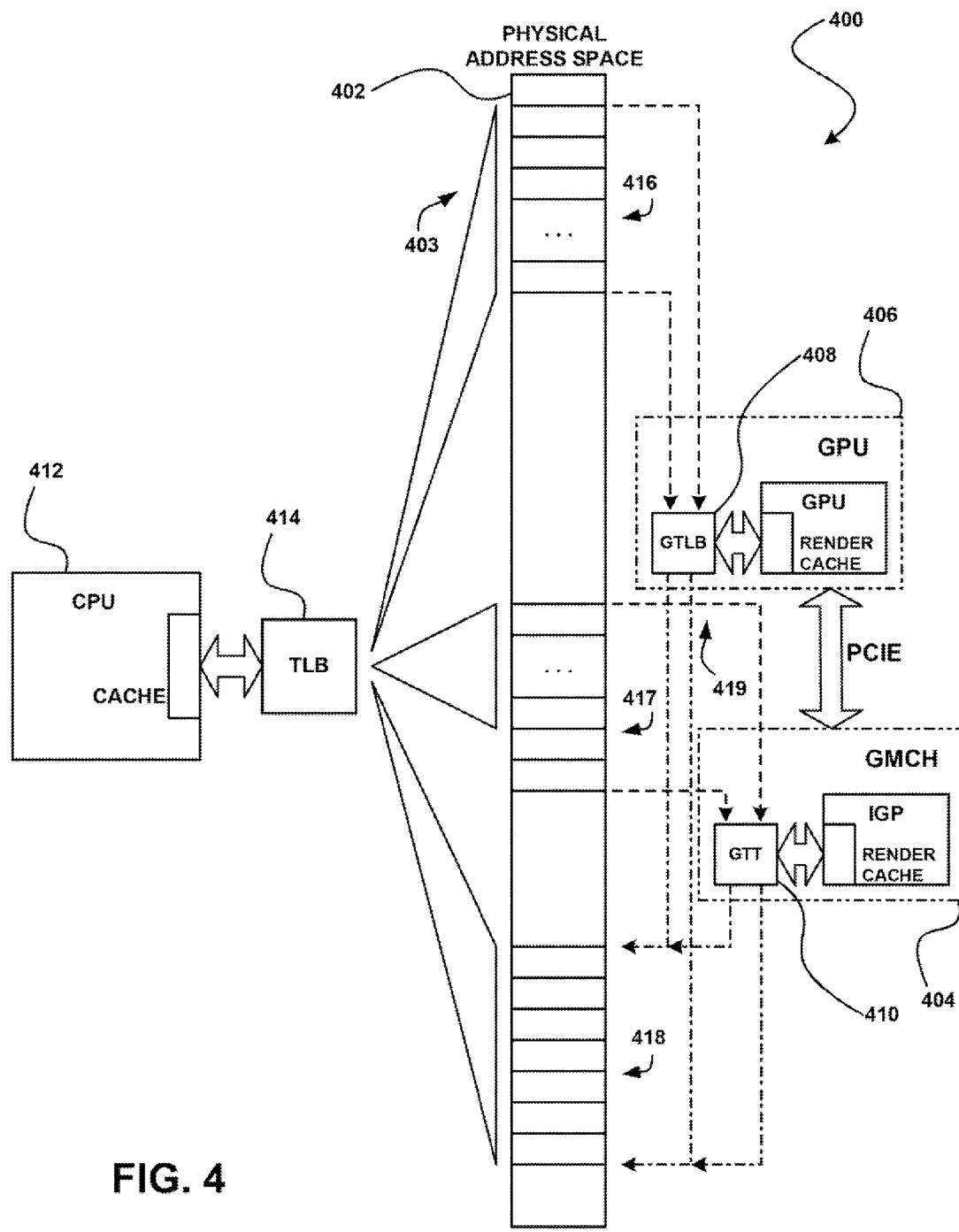
FIG. 4 shows a process for sharing memory in a multi-graphics processor environment, in accordance with one embodiment.

FIG. 4 shows a process 400 for sharing memory in a multi-graphics processor environment, in accordance with one embodiment. While the process 300 may be implemented in accordance with any of the features set forth during the description of FIG. 1A-3, the process 400 may be used in any desired environment. Yet again, the above definitions apply during the following description.

As shown, physical address space 402 may be accessed by an IGP 404 and a GPU 406 for storing rendered objects, etc. In one embodiment, the IGP 404 and the GPU 406 present graphics memory through aperture space 416, 417 into the system physical address space 402, such that it is available for writing or reading graphics objects from the memory of the IGP 404 and the GPU 406.

The GPU 406 is equipped with a graphics table look aside buffer (GTLB) 408 that includes a mapping between the pages in the physical address space 402 to a physical location (e.g. system memory page 403, local memory 419, etc.) of actual memory into a linearly contiguous aperture space 418 presented by the GPU 406 to system and other I/O processors. Similarly, the IGP 404 is equipped with a graphics translation table (GTT) 410 and a CPU 412 is equipped with a table look aside buffer (TLB) 414 for performing a similar function to create a similar mapping within a portion of the physical address space (e.g. the aperture space 417).

In one embodiment, content from the GPU local memory 419 may be merged with IGP memory by transferring between apertures. Such a transfer may be accomplished by allowing the GPU 406 to serve as a bus master for pushing data bytes from memory with the aperture 416 directly across into the aperture space 417 advertised by the IGP 404. In another embodiment, the IGP 404 may serve as a bus master and pull the data locations within the GPU aperture 416 into the IGP memory. Still yet, the CPU 412 may be used to copy the memory between apertures by reading data through the aperture space 416 and then writing into the aperture space 417. Of course, data transfer in the opposite direction is the reverse of any of the aforementioned processes. In each of these techniques, multiple aperture-to-physical memory translation processes may be occurring. These translations also potentially incur a penalty of copying data over an adapter (e.g. PCIe, etc.) and memory bus.

However, as described, the memory mapped by the GPU 406 via the GTLB 408 or IGP 404 via the GTT 410 may, in both cases, also include common system memory pages. Since these physical pages are visible and may be mapped by both devices, the IGP 404 and GPU 406 may thus include memory mappings which point to the same areas of the physical address space 402, thereby sharing graphical objects in system memory. This facilitates direct access by the GPU 406 to memory of front or back buffer surfaces of the IGP 404 as illustrated in FIG. 3 (e.g. see the back buffers 314, the front buffer 316, or the overlay surface described in the context of the memory 306, etc.). Since the mappings may alias the same physical memory, both the GPU 406 and IGP 404 can access the same actual graphics memory with only one GTLB or GTT translation penalty, and without necessarily needing to additionally copy it across the PCIe or memory bus. To this end, the related system affords coherency when sharing memory in this manner.

Figure 5:
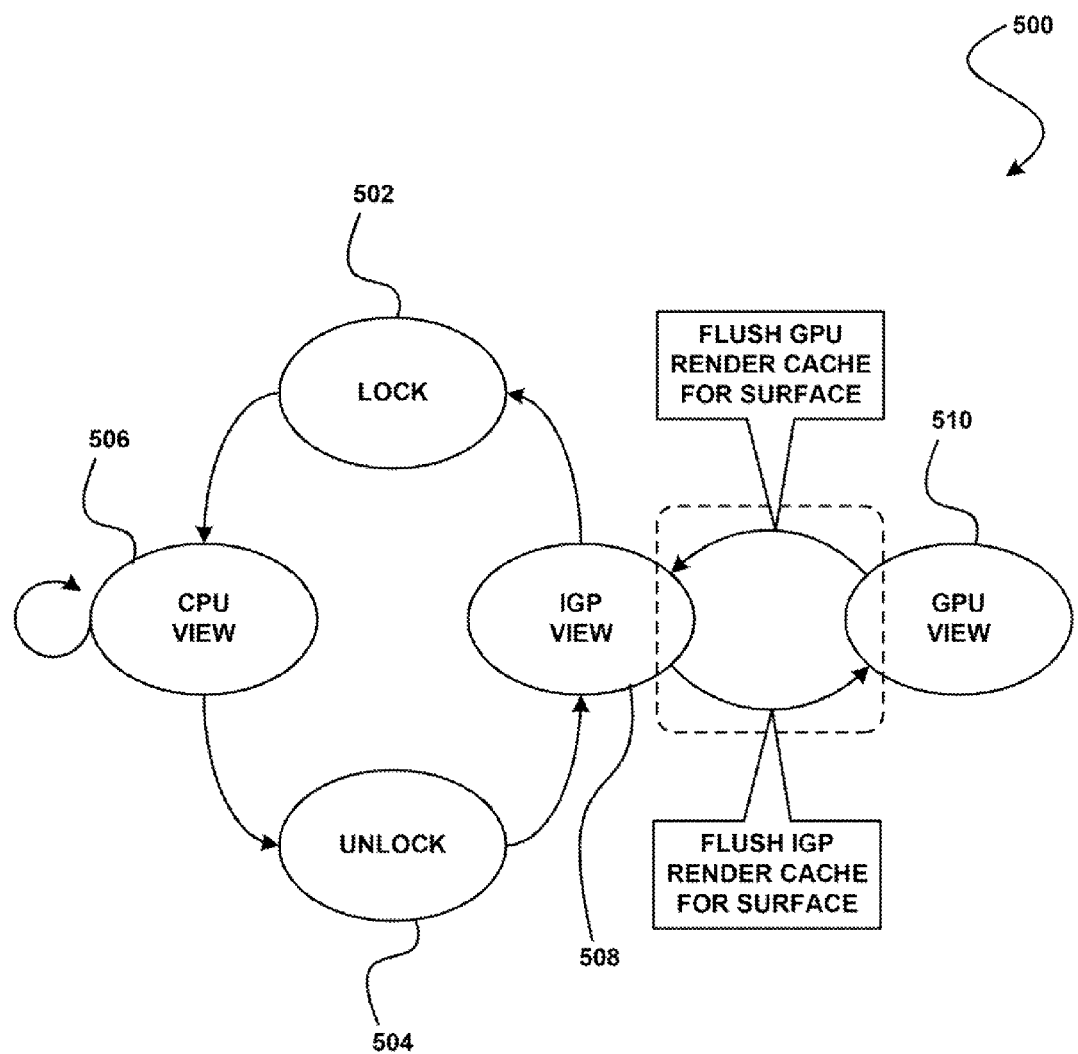
FIG. 5 illustrates a method for ensuring coherency when sharing memory in a multi-graphics processor environment, in accordance with one embodiment.

FIG. 5 illustrates a method 500 for ensuring coherency when sharing memory in a multi-graphics processor environment, in accordance with one embodiment. While the method 500 may be implemented in accordance with any of the features set forth during the description of FIG. 1A-4, the method 500 may be used in any desired environment. Yet again, the above definitions apply during the following description.

As shown, an operating system may provide synchronization events including a lock operation 502 and an unlock operation 504 for transferring "ownership" of a particular rendered surface between a CPU 506, a IGP 508, a GPU 510, etc. In the present embodiment, such rendered surface may include a window, an entire screen, data stored in a back buffer, or any other rendered object, for that matter.

In one example of use, an application executed by the CPU 506 may attempt to access a particular surface at which time the lock operation 502 may be used to allow exclusive access to such surface by the application. After the access is no longer needed, the unlock operation 504 may be used to release such exclusive control to the surface, thereby allowing access by the IGP, etc.

Still yet, additional techniques may be employed to ensure coherency with respect to memory sharing between the IGP 508 and GPU 510. For example, such additional techniques may involve flushing a respective render cache and possibly additional memory of the IGP 508 and GPU 510, as memory access control is transferred among them. This ensures coherency when carrying out the memory sharing techniques discussed earlier with respect to FIG. 4, since the IGP 508 and GPU 510 may enforce mutually exclusive ownership of shared graphics memory to facilitate cooperative use of the shared graphics memory.

Figure 6:
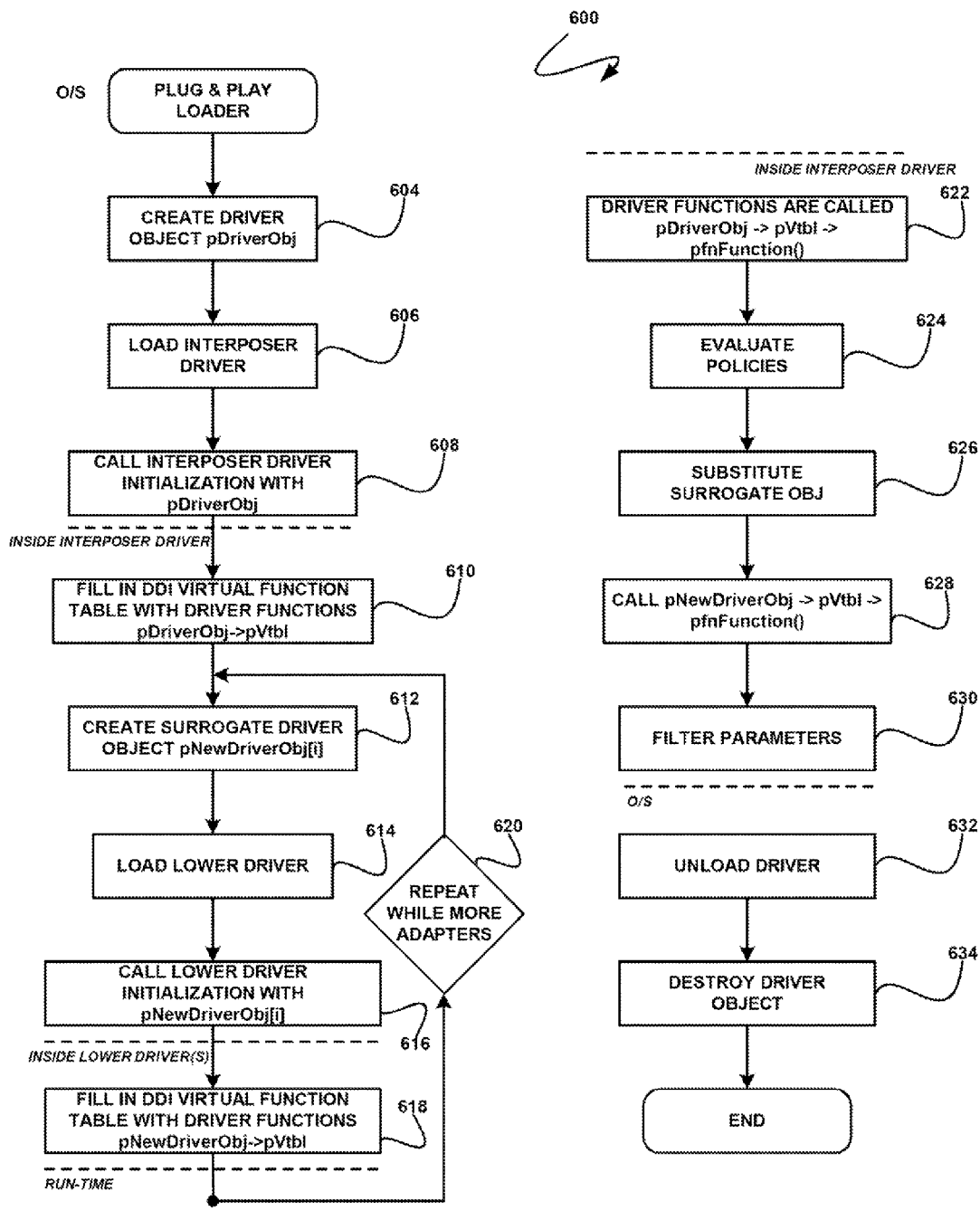
FIG. 6 illustrates a process for use in conjunction with a software layer disposed between an application and a driver, in accordance with one particular embodiment.

FIG. 6 illustrates a process 600 for use in conjunction with a software layer disposed between an application and a driver, in accordance with one particular embodiment. While the process 600 may be implemented in accordance with any of the features set forth during the description of the previous figures, the process 600 may be used in any desired environment. Yet again, the above definitions apply during the following description.

As shown, operations 604-608 are carried out by an operation system. Specifically, in operation 604, a plug-and-play loader creates a driver object. In use, an installation script may be used to link a specific plug-and-play identifier (e.g. PCI vendor & device identifier, etc.) with a specific adapter driver. In operation 606, a software layer in the form of an interposer driver is loaded. Thereafter, initialization of the interposer driver is called via the aforementioned driver object. See operation 608.

Next, operations 610-616 are carried out by the interposer driver. Specifically, a device driver interface (DDI) virtual function table is filled with driver functions. See operation 610. Further, a surrogate driver object is created, as indicated in operation 612. Thereafter, a lower driver is loaded in operation 614 for an additional graphics processor, after which initialization of the lower driver is called via the foregoing surrogate driver object. Note operation 616.

In operation 618, the lower driver then fills a DDI virtual function table with driver functions in a manner similar to that described above with respect to operation 610. Next, during runtime, operations 612-618 may be repeated for any additional graphics processors. See decision 620.

Operations 622-630 are carried out by the interposer driver after calling the application and operating system. Specifically, in operation 622, driver functions are called, after which policies are evaluated in operation 624. As needed, a surrogate driver object may be substituted in operation 626 for calling the same. Note operation 628. In use, parameters may be filtered as needed, as indicated in operation 630.

In use, the operating system may unload the driver in operation 632. The operating system may further be used for destroying any relevant driver object(s). See operation 634.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   a software layer disposed between an application and a plurality of drivers associated with a first graphics processor and a second graphics processor, where the first graphics processor and the second graphics processor share a memory, the software layer adapted to:
      receive an object from the application, the object designated by the application as to be rendered by the first graphics processor,
      determine that a display to which the first graphics processor is attached is a low voltage differential signaling display,
      determine a policy governing a routing of the object received from the application based on the determination that the display to which the first graphics processor is attached is the low voltage differential signaling display, and
      route, from the application, the object designated for rendering by the first graphics processor to the second graphics processor based on the policy determined for the low voltage differential signaling display, for rendering of the object by the second graphics processor and storage of the rendered object in the shared memory;
   wherein the first graphics processor retrieves from the shared memory the object rendered by the second graphics processor and outputs the retrieved rendered object to the low voltage differential signaling display.

2. The computer program product as recited in claim 1, wherein at least one of the first graphics processor and the second graphics processor includes a graphics processing unit.

3. The computer program product as recited in claim 1, wherein the second graphics processor is asymmetric in capabilities or performance with respect to the first graphics processor.

4. The computer program product as recited in claim 1, wherein the memory shared by the first graphics processor and the second graphics processor includes at least a portion of a frame buffer of the first graphics processor.

5. The computer program product as recited in claim 1, wherein the software layer interfaces an operating system application program interface.

6. The computer program product as recited in claim 1, wherein the software layer includes an additional driver.

7. The computer program product as recited in claim 1, wherein the policy is power related.

8. The computer program product as recited in claim 7, wherein the policy is a function of an existence of an alternating current source.

9. The computer program product as recited in claim 1, wherein the policy is object related.

10. The computer program product as recited in claim 9, wherein the policy is a function of a format of the object to be rendered.

11. The computer program product as recited in claim 1, wherein the policy is user configured.

12. The computer program product as recited in claim 1, wherein the policy is application related.

13. The computer program product as recited in claim 12, wherein the policy is a function of a type of the application.

14. The computer program product as recited in claim 12, wherein the policy is a function of a processor load of the application.

15. The computer program product as recited in claim 12, wherein the policy is a function of an operating system on which the application is executed.

16. The computer program product as recited in claim 1, wherein a user input provided via a button, a system setup option, or a runtime user interface affects the determination of the policy.

17. The computer program product as recited in claim 16, wherein the user input indicates a preference for performance versus battery efficiency.

18. The computer program product as recited in claim 17, wherein the user input affects a preference between the first graphics processor and the second graphics processor.

19. The computer program product as recited in claim 1, wherein the software layer that is disposed between the application and the plurality of drivers is exposed to the application as a single driver, and the plurality of drivers are loaded as a plurality of driver modules of the single driver.

20. The computer program product as recited in claim 1, wherein the policy is utilized for routing the object as a function of multiple aspects of a system including a type of the display, the software layer, the application, the drivers, the first graphics processor and the second graphics processor.

21. The computer program product as recited in claim 1, wherein the software layer is further adapted to:
   intercept a vertical blanking signal triggering an interrupt service routine for flipping a back buffer and a front buffer, and
   initiate an additional interrupt service routine for flipping the back buffer and the front buffer, and for synchronizing at least one of the first graphics processor and the second graphics processor.

22. The computer program product as recited in claim 1, wherein the shared memory outputs to a display timing controller of the first graphics processor and the display, such that upon rendering the object by the second graphics processor the rendered object is stored to a first buffer of the shared memory, where the first buffer of the shared memory outputs to a second buffer of the shared memory, and the second buffer of the shared memory makes available the rendered object via a display back-end of the first graphics processor.

23. The computer program product as recited in claim 22, wherein the first graphics processor is used exclusively to feed the display.

24. The computer program product as recited in claim 23, wherein a vertical blanking signal is fed to the second graphics processor by the software layer, and the second graphics processor stores the rendered object into the first buffer of the shared memory in synchronicity with a display of other objects managed by the first graphics processor.

25. A method, comprising:
  receiving an object from an application, the object designated by the application as to be rendered by a first graphics processor, at a software layer disposed between the application and a plurality of drivers associated with the first graphics processor and a second graphics processor, where the first graphics processor and the second graphics processor share a memory;
  determining that a display to which the first graphics processor is attached is a low voltage differential signaling display;
  determining a policy governing a routing of the object received from the application based on the determination that the display to which the first graphics processor is attached is the low voltage differential signaling display; and
  routing, from the application, the object designated for rendering by the first graphics processor to the second graphics processor based on the policy determined for the low voltage differential signaling display, for rendering of the object by the second graphics processor and storage of the rendered object in the shared memory;
  wherein the first graphics processor retrieves from the shared memory the object rendered by the second graphics processor and outputs the retrieved rendered object to the low voltage differential signaling display.

26. A system, comprising:
a first graphics processor;
a second graphics processor;
a memory, the memory shared between the first graphics processor and the second graphics processor; and
a software layer disposed between an application and a plurality of drivers associated with the first graphics processor and the second graphics processor, the software layer adapted to:
  receive an object from the application, the object designated by the application as to be rendered by the first graphics processor,
  determine that a display to which the first graphics processor is attached is a low voltage differential signaling display,
  determine a policy governing a routing of the object received from the application based on the determination that the display to which the first graphics processor is attached is the low voltage differential signaling display, and
  route, from the application, the object designated for rendering by the first graphics processor to the second graphics processor based on the policy determined for the low voltage differential signaling display, for rendering of the object by the second graphics processor and storage of the rendered object in the shared memory;
  wherein the first graphics processor retrieves from the shared memory the object rendered by the second graphics processor and outputs the retrieved rendered object to the low voltage differential signaling display.

27. A system recited in claim 26, wherein at least one of the first graphics processor and the second graphics processor is in communication with the display and a central processing unit via a bus.

28. A system recited in claim 27, wherein the first graphics processor and the second graphics processor map common system memory pages via the bus to facilitate sharing graphical objects in the shared memory.

29. A system recited in claim 28, wherein the first graphics processor and the second graphics processor enforce mutually exclusive ownership of the shared graphics-memory to facilitate cooperative use of the shared memory.

30. The system as recited in claim 26, wherein the policy includes a table that correlates at least one aspect of the system with one of the first graphics processor and the second graphics processor.

* * * * *